United States Patent
Thompson (10) Patent No.: US 9,398,461 B2
(45) Date of Patent: Jul. 19, 2016

(54) HANDLING INFORMATION (75) Inventor: Peter Thompson, Bath (GB)

(73) Assignee: Vodafone Group PLC, Berkshire (GB)

( * ) Notice: Subject to any disclaimer, the term of this patent is extended or adjusted under 35 U.S.C. 154(b) by 1732 days.

(21) Appl. No.: 12/311,077

(22) PCT Filed: Sep. 18, 2007

(86) PCT No.: PCT/GB2007/003517
§ 371 (c)(1),
(2), (4) Date: Nov. 24, 2009

(87) PCT Pub. No.: WO2008/035048
PCT Pub. Date: Mar. 27, 2008

(65) Prior Publication Data
US 2010/0091763 A1    Apr. 15, 2010

(30) Foreign Application Priority Data
Sep. 18, 2006 (GB) .................................. 0618313.1

(51) Int. Cl.
| H04L 15/06 | (2006.01) |
| H04W 12/08 | (2009.01) |
| H04L 29/12 | (2006.01) |
| H04L 12/741 | (2013.01) |
| H04L 29/06 | (2006.01) |
| H04L 29/08 | (2006.01) |

(52) U.S. Cl.
CPC ......... *H04W 12/08* (2013.01); *H04L 29/12132* (2013.01); *H04L 29/12188* (2013.01); *H04L 45/745* (2013.01); *H04L 61/1552* (2013.01); *H04L 61/1588* (2013.01); *H04L 63/102* (2013.01); *H04L 67/02* (2013.01)

(58) Field of Classification Search
CPC ................... H04L 29/12132; H04L 29/12188; H04L 45/745; H04L 61/1588; H04L 63/102; H04L 61/1552; H04L 67/02; H04W 12/08
See application file for complete search history.

(56) References Cited

U.S. PATENT DOCUMENTS

| 6,064,666 A * | 5/2000 | Willner et al. ................. 370/352 |
| 6,148,342 A | 11/2000 | Ho |
| 2001/0054108 A1* | 12/2001 | Lincoln et al. ................. 709/238 |
| 2004/0098625 A1* | 5/2004 | Lagadec et al. ............... 713/201 |
| 2005/0036482 A1* | 2/2005 | Goroshevsky et al. ........ 370/352 |
| 2005/0043041 A1* | 2/2005 | Ignatius et al. ............. 455/456.2 |
| 2005/0137981 A1* | 6/2005 | Maes .............................. 705/44 |
| 2006/0172744 A1* | 8/2006 | Tornkvist et al. .......... 455/456.1 |

FOREIGN PATENT DOCUMENTS

| WO | WO 2004/036513 A1 | 4/2004 |
| WO | WO2005/114478 A2 | 12/2005 |

* cited by examiner

*Primary Examiner* — Luat Phung
(74) *Attorney, Agent, or Firm* — Knobbe, Martens, Olson & Bear, LLP (57) ABSTRACT A communication method, for use with a telecommunications system, enables special communications to be routed to respective devices in a group of the devices by addressing the devices with a respective special identifier. The telecommunications system includes a network core and a plurality of subscriber devices registered with the network core. The core enables communications to be routed to the devices by a respective ID allocated to each device. The method further includes maintaining a store of the special identifier of each device in the group and a corresponding value derived from the ID. The method enables the special identifier of a device in the group to be obtained from the store by providing the store with the corresponding value derived from that device's ID.

16 Claims, 6 Drawing Sheets

HANDLING INFORMATION

FIELD OF THE INVENTION

This application relates to making available data to a third party, which data relates to an entity identified by an ID. The ID may be sensitive or confidential. This application also relates to a communication method for use with a telecommunications system which comprises a network core and a plurality of subscriber devices registered with the network core, the core enabling communications to be routed to the devices by a respective ID allocated to each device. This application also relates to a communication system operable to perform a communication method.

BACKGROUND OF THE INVENTION

The Mobile Station International ISDN number (MSISDN) is the standard telephone number that is used to identify a subscriber to a telecommunications network. The MSISDN therefore provides means for uniquely identifying a mobile user of a mobile telecommunications network. The MSISDN is considered by mobile phone operators to be sensitive information. This is because if third parties are able to access the MSISDNs registered with a network, there is a risk that the third party will commence activities such as nuisance calling or sending spam messages to subscribers. Therefore mobile phone operators are reluctant to reveal the MSISDNs of their subscribers to third parties.

The third generation partnership project (3GPP) has recently defined a new concept known as IMS (IP-based Multimedia Subsystem). The IMS is a set of core network servers sitting behind the GGSN (which will be briefly described below) in the packet switched domain. These servers are introduced in order to process signalling between end users. The aim of IMS is to allow bodies such as mobile telephone network operators to provide services to their users as efficiently and effectively as possible. For example, the IMS architecture is likely to support the following communication types, voice, video, instant messaging, "presence" (a user's availability for contact), location-based services, email and the web. Further communication types are likely to be added in the future.

The diverse collection of communications devices requires efficient session management due to the number of different applications and services that will be developed to support these communication types. The 3GPP have chosen Session Initiation Protocol (SIP) for managing these sessions.

The SIP protocol is a session-based protocol designed to establish IP based communication sessions between two or more end points or users. Once a SIP session has been established, communication between these end points or users can be carried out using a variety of different protocols (for example those designed for streaming audio and video). These protocols are defined in the SIP session initiation messages.

With IMS, users are no longer restricted to a separate voice call or data session. Sessions can be established between mobile devices that allow a variety of communication types to be used and media to be exchanged. The sessions are dynamic in nature in that they can be adapted to meet the needs of the end users. For example, two users might start a session with an exchange of instant messages and then decide that they wish to change to a voice call, possibly with video. This is all possible within the IMS framework. If a user wishes to send a file to another user and the users already have a session established between each other (for example, a voice session) the session can be redefined to allow a data file exchange to take place. This session redefinition is transparent to the end user.

For some of the services supported by IMS, in particular instant messaging supported by a third party service provider, it has hitherto been necessary for mobile operators to exchange information concerning the identity of their subscribers, e.g. the MSISDN, with the third party service provider. This is because in such implementations of instant messaging, each user is identified by a respective username that is allocated by the third party service provider. However, because such user names are typically not widely known, the service provider also needs to know each user's MSISDN, as this is much more widely known. This allows users to participate in instant messaging when they only know the MSISDN of their contact (and not the username). The usernames are stored in a look-up table against the MSISDN and possibly other contact details (e.g. email address) on a server which is administered by the third party service provider. However, as explained previously, network operators consider disclosing such sensitive information as the MSISDN to be undesirable. Accordingly, it would be desirable to solve this problem and general problems related to making data available.

SUMMARY OF THE INVENTION

According to the system described herein, a method of making available data to a third party, which data relates to an entity identified by an ID, includes associating said data in a store with a corresponding value derived from said ID, and enabling said data to be retrieved by the third party from the store by the third party providing said corresponding value to the store.

The ID may be a unique identifier of a member of a group. For example, the ID may be the MSISDN of a mobile telecommunications network subscriber, the landline telephone number or many other types of identifier. The ID may be a personal identifier, and may be confidential or sensitive. The entity identified by the ID may not wish the ID to be made freely available to third parties without any control or conditions.

In the enabling step mentioned above, the third party may derive the corresponding value from the ID. For example, the third party may comprise a mobile telecommunications terminal or a personal computer which includes an application capable of calculating the corresponding value from the ID. The ID may be stored by the third party, which conveniently enables the application to perform the calculation by retrieving the stored ID. By requiring the third party to derive the corresponding value from the ID, this prevents third parties that are not capable of performing this derivation from generating the corresponding value and obtaining the relevant data from the store. This protects the data and prevents it from being retrieved by a third party that does not have the ID and the ability to calculate the corresponding value from that ID.

The ID and corresponding value may be such that the ID cannot be derived from the corresponding value. For example, the corresponding value may be derived from the ID by irreversible encryption of the ID or a value representative of the ID. The corresponding value may be derived from the ID by hashing algorithm, such as an MD 5 hashing algorithm.

The data stored in the store, and selectively retrievable by a third party, may, for example, be a pointer (for example a URL) to an entry for the entity in a social networking website, such as Facebook, but could of course be many other types of data. In the second aspect of the invention, described below, the data is a "special identifier", for example, an instant messaging user name.

In the embodiment the store is administered by a party, separately from the network core. For example, the store is administered by a party which is a separate legal or functional entity from the network store. The store may be geographically separated from the network core. Because the store is separate from the network core, it is desirable that the network core is not provided with the ID in order to avoid possible abuse of or unauthorised disclosure of the ID.

Although an MD5 hashing algorithm is described in the embodiments, it should be understood that other types of hashing algorithm could be used to generate the "corresponding value", such as the proposed MD6 hashing algorithm. Also, a "message digest" of the MSISDN could be generated in order to provide the "corresponding value".

According further to the system described herein, a communication method is provided for use with a telecommunications system which comprises a network core and a plurality of subscriber devices registered with the network core, the core enabling communications to be routed to the devices by a respective ID allocated to each device, the method enabling special communications to be routed to respective devices in a group of the devices by addressing the devices with a respective special identifier. The method includes maintaining a store of the special identifier of each device in the group and a corresponding value derived from the ID, and which enables the special identifier of a device in the group to be obtained from the store by providing the store with the corresponding value derived from that device's ID.

In one embodiment, the store is administered by a third party, which is separate from the communications core to which the mobile devices are subscribers. The method allows a user of a first device to obtain the instant messaging user name ("special identifier") of the second device in the same group from the store, without requiring the first device to provide the store with the MSISDN ("ID") of the second device or requiring the store to store the MSISDN of the second device.

In this embodiment the instant messaging user name of the second device is stored in a look-up table together with a corresponding value derived from the MSISDN. This corresponding value may be derived from the MSISDN by a hashing algorithm, such as the MD5 hashing algorithm. The corresponding value is such that the MSISDN cannot be derived from the corresponding value. Thus, knowledge of the corresponding value by the store does not enable the store, or bodies which have access to the store, to derive the MSISDN of any device. Thus, the secrecy of the MSISDN of the mobile device is preserved.

If the user of a mobile terminal in the group wishes to obtain the user name of a second device in the group, and the first device knows the MSISDN of the second device, the client application installed on the first device generates a "corresponding value" derived from the MSISDN of the second device by performing, in the embodiment, the MD 5 hashing algorithm or the MSISDN of the second device. This hashed value—MD5 [MSISDN]—is then sent to the store. If the user of the second device is already a member of the group, the user name of the second device will be stored in the store together with the "corresponding value" derived from the second device's MSISDN—that is, in this embodiment, MD5 [MSISDN]. A search is performed of the look-up table of the store to find a match between the MD5 [MSISDN] received from the first device and the MD5 [MSISDN] values stored in the look-up table. When a match is found, the corresponding user name of the second device is retrieved and is sent to the first device. The user of the first device is thereafter able to commence instant messaging with the second device after obtaining the user name from the store based on knowledge in the first device of the MSISDN of the second device, but without the store ever being provided with the MSISDN of the second device. The store is only provided with a "corresponding value" derived from the second device's MSISDN, and the MSISDN cannot be derived from that corresponding value (because, in this embodiment, that corresponding value is generated by an MD5 hashing algorithm).

In this embodiment, when a device wishes to join the group, this may be performed by the user of that device accessing a user registration portal (typically a web page) which contains, for example, a Java-script MD5 hashing function. When the user provides their MSISDN to the web page, the Java-script MD5 hashing algorithm generates the "corresponding value" (MD5 [MSISDN]), and transmits this to the store. The user name corresponding to that MD5 [MSISDN] value is then generated and stored in the look-up table of the store. Again, the store never receives the MSISDN of the device in the clear.

The system described herein also relates to a system and a communication service provider device.

BRIEF DESCRIPTION OF THE DRAWINGS

Embodiments of the system described herein will now be explained, by way of example only, with reference to the accompanying drawings, in which.

DETAILED DESCRIPTION OF VARIOUS EMBODIMENTS

Figure 1:
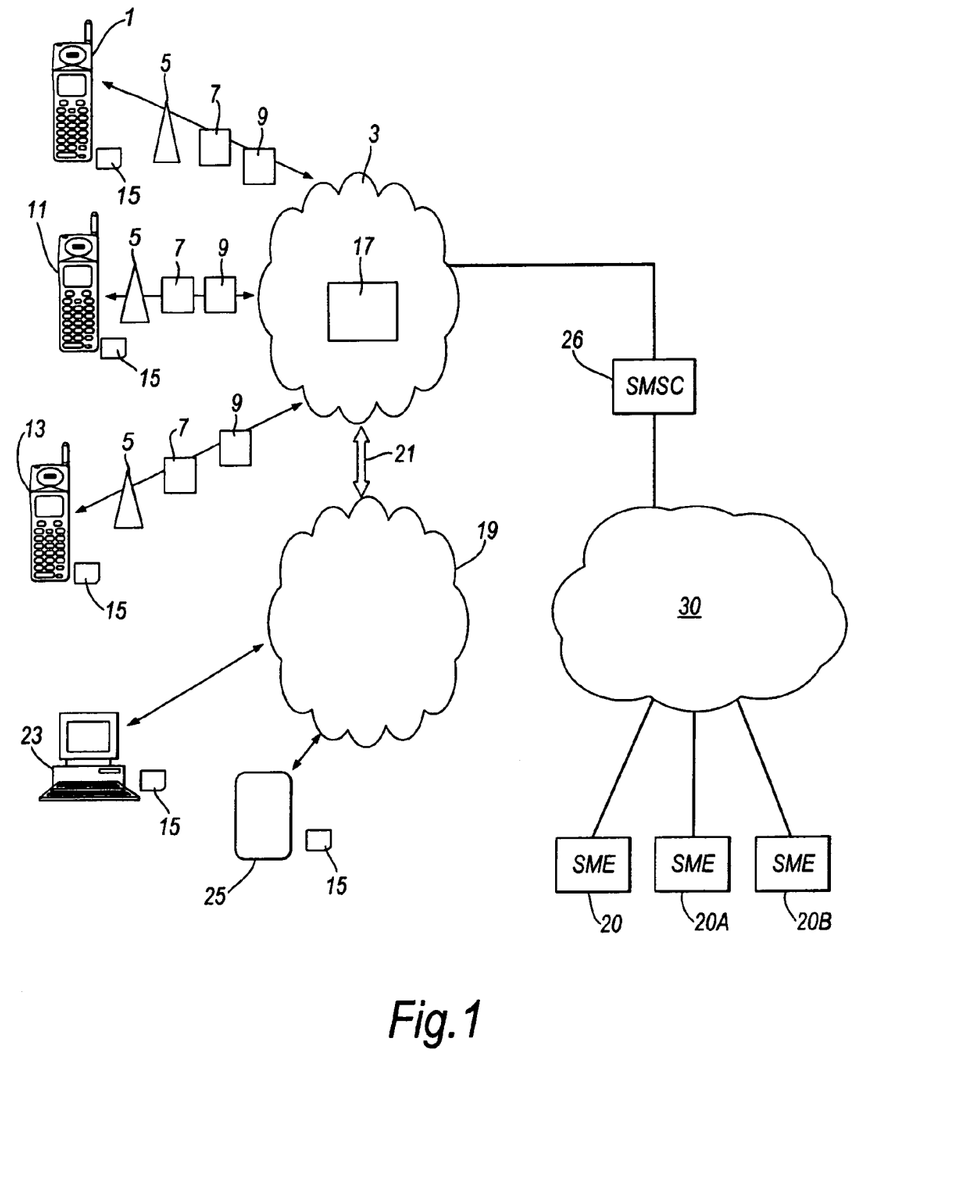
FIG. 1 shows schematically the elements of a communications network, including a cellular or mobile telecommunications network.

FIG. 1 shows a cellular network. However, it should be appreciated that the system described herein is applicable to any type of network, although it is particularly applicable to a network where at least some of the devices communicate using mobile telecommunications/wireless data transmission. Mobile terminal 1 is registered with GSM/GPRS or UMTS (3G) mobile telecommunications network 3. The mobile terminal 1 may be a handheld mobile telephone, a personal digital assistant (PDA) or a laptop computer equipped with a datacard. The mobile terminal 1 communicates wirelessly with mobile telecommunications network 3 via the radio access network (RAN) of the mobile telecommunications network 3, comprising, in the case of a UMTS network, base station (Node B) 5, and radio network controller (RNC) 7. Communications between the mobile terminal 1 and the mobile telecommunications network 3 are routed from the radio access network via GPRS support nodes (SGSN) 9, which may be connected by a fixed (cable) link to the mobile telecommunications network 3.

In the conventional manner, a multiplicity of other mobile terminals are registered with the mobile telecommunications network 3. These mobile terminals include mobile terminals 11 and 13. The terminals 11 and 13 communicate with the mobile telecommunications network 3 in a similar manner to the terminal 1, that is via an appropriate Node B 5, RNC 7 and SGSN 9.

The mobile telecommunications network 3 includes a gateway GPRS support node (GGSN) 17 which enables IP-based communications with other networks, such as the Internet 19 via an appropriate link 21. A multiplicity of terminals are connected to the Internet (by fixed or wireless links), and a PC terminal 23 and a PDA terminal 25 are shown by way of example.

Each of the mobile terminals 1, 11 and 13 are provided with a respective subscriber identity module (SIM) 15. The SIM 15 is pre-programmed with a unique identification number, the "International Mobile Subscriber Identity" (IMSI) which is not visible on the card and is not known to the subscriber. The subscriber is issued with a publicly usable number, that is, the subscriber's telephone number, by means of which calls to the subscriber are initiated by callers. This number is the MSISDN. During the manufacturing process of each SIM, authentication information is also stored thereon under the control of the mobile telecommunications network 3. The mobile telecommunications network 3 itself stores details of each of the SIMs issued under its control. In operation of the mobile telecommunications network 3, a terminal 1, 11, 13 is authenticated (for example, when the user activates the terminal in the network with a view to making or receiving calls) by the network sending a challenge to the terminal 1, 11, 13 incorporating a SIM 15, in response to which the SIM 15 calculates a reply (dependent on the predetermined information held on the SIM—typically an authentication algorithm and a unique key Ki) and transmits it back to the mobile telecommunications network 3. The SGSN 9 checks that the reply received matches the expected calculated reply. If they match, the SIM 15 and the associated mobile terminal are considered to be authenticated.

It should be understood that such an authentication process can be performed for any terminal provided with a SIM 15 under control of the mobile telecommunications network 3. In the embodiment the terminal communicates wirelessly with the mobile telecommunications network 3 via the network's radio access network, although this is not essential. For example, the terminal may communicate with the network via the fixed telephone network (PSTN), via a UMA "access point" and/or via the Internet. The PC 23 and the PDA 25 may also be provided with a SIM 15 under the control of the network.

The SIM 15 used by the terminal 1,11,13,23,25 may be a SIM of the type defined in the GSM or UMTS standards specifications, or may be a simulation of a SIM—that is, software or hardware that performs a function corresponding to that of the SIM. The SIM may be in accordance with the arrangement described in WO-A-2004 036513.

It should be noted that the authentication process being described does not necessarily authenticate the human identity of the user. For example, mobile telecommunication networks have pre-pay subscribers who are issued with SIMs in return for pre-payment, enabling them to use network services. However, the identity of such pre-pay subscribers may not be known by the network. Nevertheless, such a user cannot make use of the network until the network has authenticated the user's SIM—that is, has confirmed that such user is a particular user who has a particular pre-paid account with a network.

The network shown in FIG. 1 comprises both the mobile telecommunications network 3 and the Internet 19 (which itself comprises a multiplicity of other networks).

The procedure for transmission of "short messages" is different. The term "short messages" or "SMS messages" as used in relation to the embodiments means short messages as defined in the GSM or 3G standard specifications. Such messages are commonly in the form of text messages of limited maximum length, but they can have other forms, such as in the form of binary data, or may contain configuration data for changing the functional parameters of a mobile.

Short messages may be sent to or from mobiles such as the mobiles 1,11,13 and the others belonging to the network 3. However, in addition, short messages may be sent to or from "short message entities" (SMEs) such as shown at 20,20A, 20B. These SMEs may be in the form of terminals of various sorts such as fixed terminals for sending short messages of various types to mobiles and for receiving short messages from mobiles. For example, the SMEs may be in the form of terminals associated with banking computers or computers of other types generating information (commercial information, for example) for transmission to mobiles and for receiving short messages in response from mobiles, but may be of many other types, such as application servers of various types.

The network 3 has a short message service centre (SMSC) 26 associated with it. The SMEs 20,20A,20B are connected to the SMSC 26 by fixed networks 30 of suitable type. When a mobile wishes to send a short message, it will do this via the SMSC 26 of its network 3. Thus, for example, if the mobile 1 wishes to send a short message to mobile 11, the short message is automatically addressed by the mobile 11 to SMSC 26, which then delivers the short message to mobile 11 (after registering the necessary details to enable a charge to be made to mobile 1). Each short message therefore carries the address of the local SMSC (this address is automatically generated by the sender), together with the address of the intended destination of the short message. When the local SMSC receives the short message, it then reads the address (the MSISDN or Mobile Station ISDN number or telephone number of the intended destination) and despatches the short message accordingly.

In the first embodiment now to be described in more detail, users of mobile terminals 1, 11 and 13 (hereinafter "user terminals") are able to perform instant messaging.

Each user device that is to perform instant messaging has a special "communication" smart client application installed thereon. The client application is, in the embodiment, a Java or a C++ based client application running on the user device and providing seamless integration and a consistent "look and feel". The client application allows particular services or functions to be accessed simply with a minimal number of key presses. The client application provides access to user device functionality. For example, if the user device is a mobile telecommunications handset, such functionality might include a built-in camera, the device's file system and its Bluetooth connectivity. This allows presence information, content, location information and other information to be easily accessed and shared by exchange of instant messages.

A server administrates membership of instant messaging communities. The server is an Internet-hosted system with direct connection to a number of communications gateways, such as SMS and MMS gateways. The server may contain various logical entities that allow incoming client requests to be received and processed. In the embodiment, the server is administered by a third party service provider, separate from the network operator 3 with which the mobile terminals 1, 11 and 13 are registered.

The server system provides a Java servlet based interface that handles the sending and receiving of information from the client application using a specifically defined XML schema. A web page of the XHTML based portal allows users to create and maintain a variety of communities.

Preferably, communication between the server and the user device is via an "always on" GPRS or 3G data connection. If such a data connection is not available, communication may be by SMS. However, it should be understood that the user devices are not necessarily mobile telecommunications devices, but might instead be a personal computer (PC). Communications between the server and the computer may be performed via the fixed Internet, for example by using email messages.

Client—Server Architecture

Figure 2:
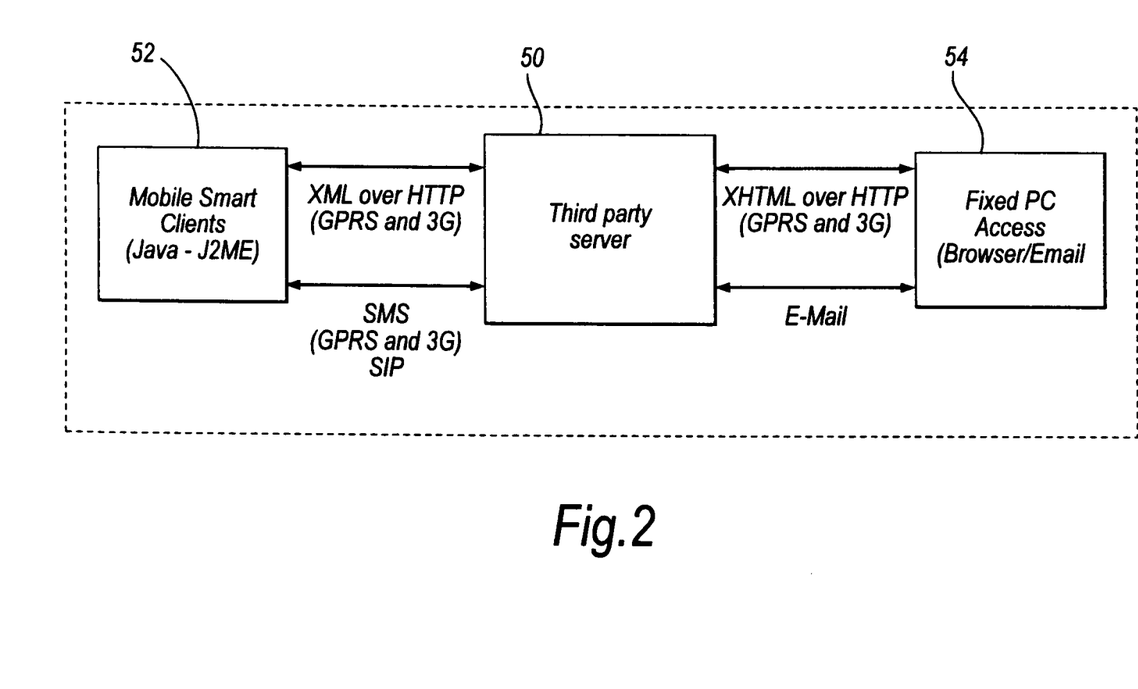
FIG. 2 shows the client-server architecture of a first embodiment.

FIG. 2 shows schematically the basic client-server architecture. As indicated above, the server is an Internet-hosted system, administered by a third party. The client application 52 of a first user device, comprising a cellular or mobile telecommunications device is shown. As indicated, communications between the server 50 and the client 52 may use XML over HTTP protocol by means of a GPRS or 3G bearer. Additionally, the communication may be by SMS message. Other communication frameworks may be used, such as IMS through the inclusion of SIP stacks (this would allow peer-to-peer communications between devices in the same community).

A client application 54 of a fixed PC is also shown. Communication between the server 50 and the client application of the fixed PC 54 may be by XHTML over HTTP protocol by means of a GPRS or 3G bearer, or by email.

Client Logical Entities

Figure 3:
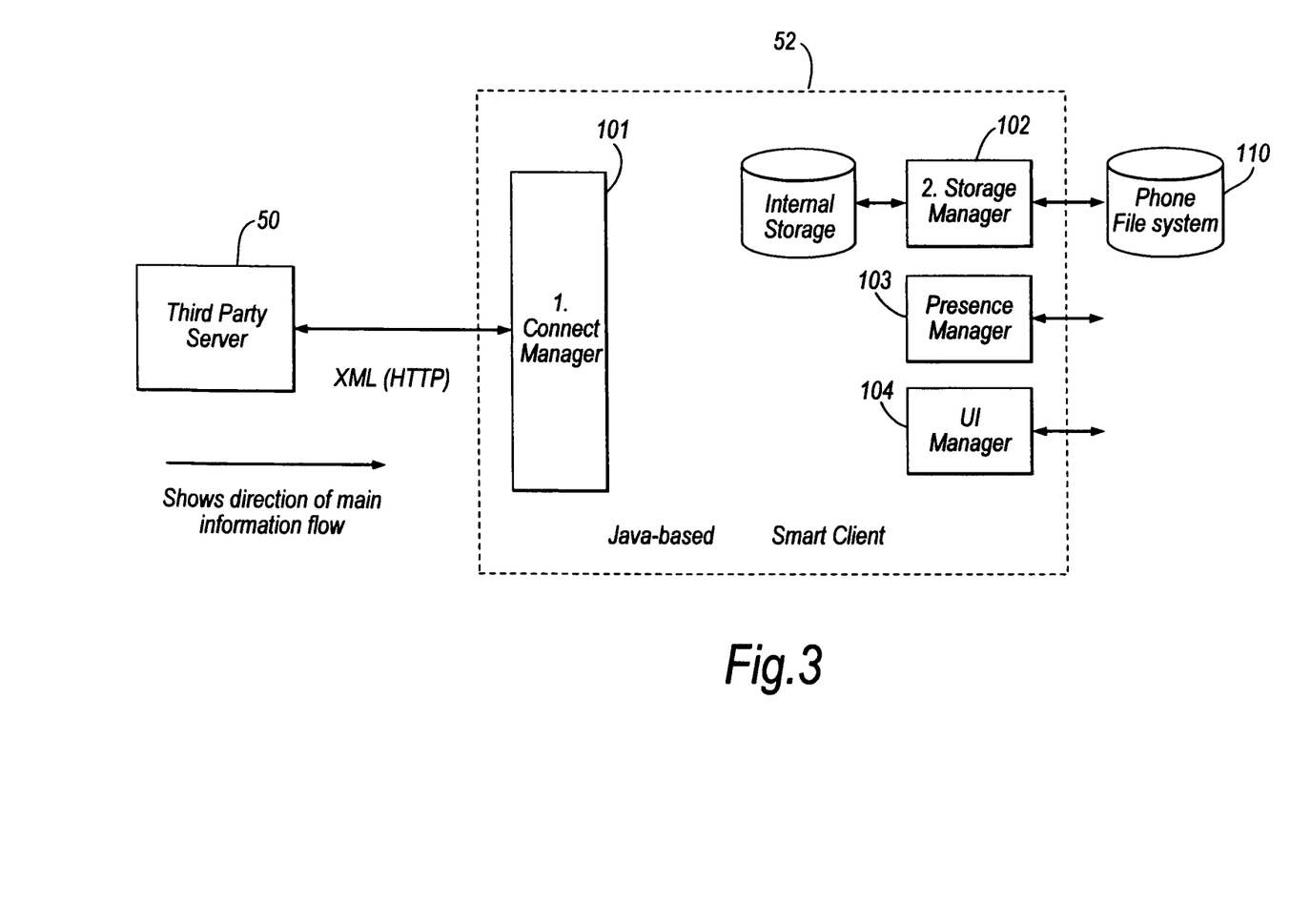
FIG. 3 shows the logical entities of the client application.

The client 52 is shown in more detail in FIG. 3. The client 52 consists of a number of logical entities:—

101. Connection Manager—this handles the sending, receiving and parsing of information (such as messages and content from the client and community service updates) via a specifically defined XML schema (the connection manager 101 is multi-threaded to handle the sending and receiving of information from the server 50 as a background process allowing the user full control over the user interface during this time). The XML schema has its own unique structure.

102. Storage Manager—handles the storage and retrieval of information from the client's internal storage (used to contain a local copy of a user's contact information to provide an improved user experience) as well as the user device's internal file system 110 (the user can browse content stored external to the client on their phone).

103. Presence manager—handles the presence information of the user and of other users in the user's contacts. The presence manager deals with requests from the user to change his presence state, stores the user's presence state in a local cache and informs the server 50 of any changes to the user's presence state. When required by the user, the presence manager also sends requests to the server 50 to determine the presence state of other users.

104. UI Manager—handles the User Interface between the client 52 and user including the rendering of a Graphical User Interface (GUI) to allow users to easily navigate between community environments and use specific services within these environments.

Server Logical Entities

Figure 4:
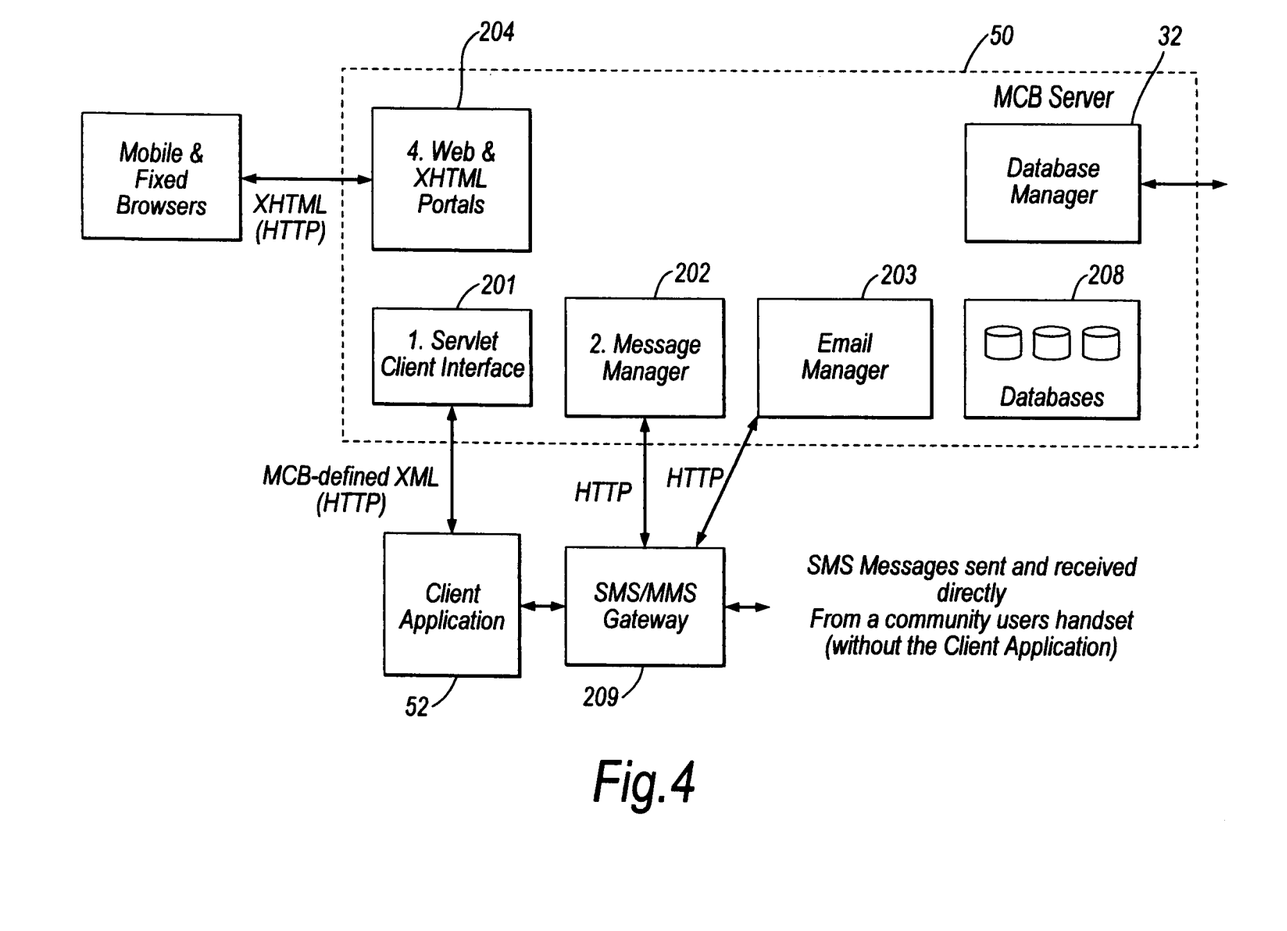
FIG. 4 shows the logical entities of the server.

The server 50 is shown in more detail in FIG. 4. The server 50 consists of a number of logical entities:—

201. Servlet Client Interface—this entity consists of a number of Java Servlet components that act as an interface between the smart client 52 and the server 50. These servlets effectively act as listeners for incoming client requests and are used to transfer information between client and server using a defined XML schema over HTTP.

202. Message Manager—handles the sending and receiving of SMS, WAP Push, and E-Mail messages through a connection to an SMS/MMS Gateway 209 and the internal E-Mail Manager 203. The message manager 202 also generates specially formatted 'Java-Push-download' messages that are used to trigger specific actions within the smart client.

203. E-Mail Manager—handles the sending and receiving of emails between the third party server and the external Internet.

204. Web and XHTML Portals—these portals provide a fixed and mobile web interface to the server 50 to allow users to manage their community environments.

208. Databases—various databases storing data relating to communities.

32. Database manager—handles updates and requests to search the databases stored on the server Registration In the first embodiment, the third party communications service provider administers a database of usernames for instant messaging between terminals.

Figure 5:
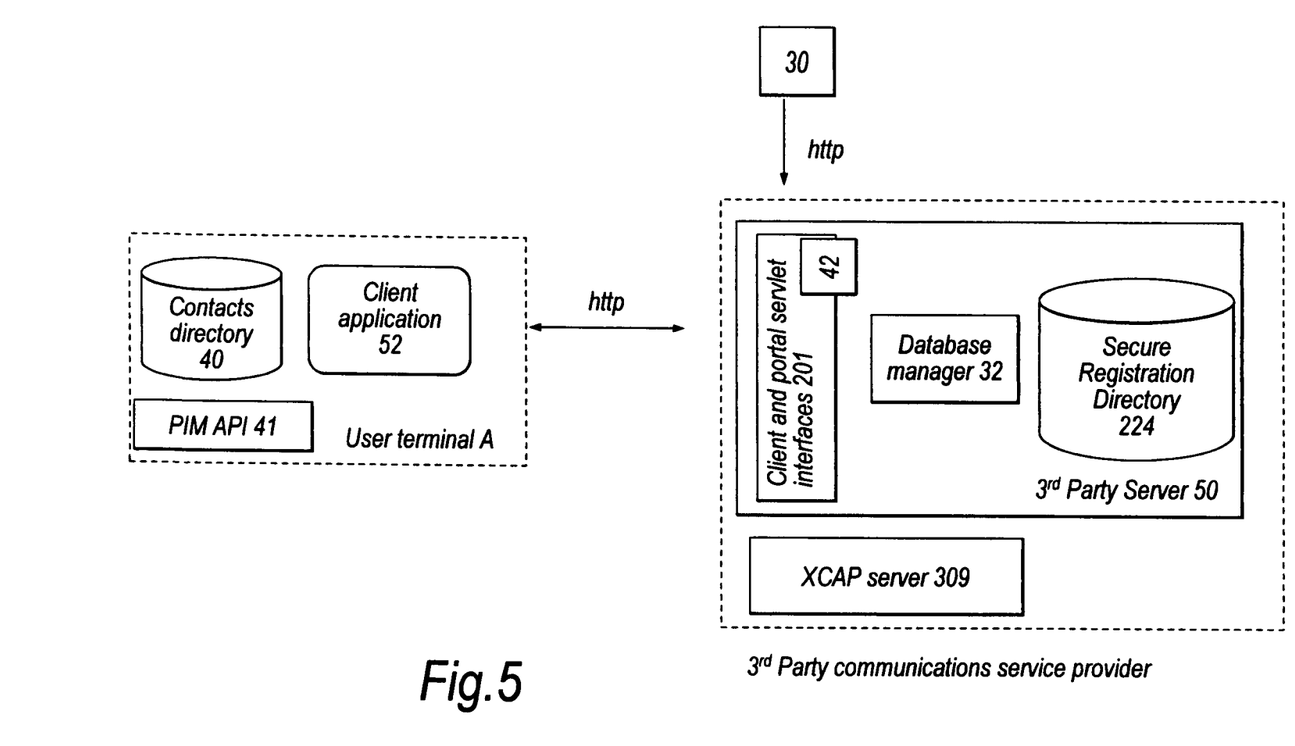
FIG. 5 shows the exchanges that take place between the client application and the server.

The process by which users can register for the instant messaging service will now be described with reference to FIG. 5. A user of a mobile terminal A registered with the network 3 accesses the Internet through the web browser on his mobile terminal (or any other device connected to the Internet). The user types in the http address of the registration web page 30 (administered by his network operator) for the service. The user then enters his MSISDN into a registration form on the registration page 30, together with the username that he wishes to use for instant messaging and any other relevant contact information.

The user then submits the registration form by clicking the appropriate button. The web page 30 contains a known JavaScript code, including an MD5 hashing algorithm. The MD5 hashing algorithm generates an MD5 hash of the MSISDN (it encrypts the MSISDN data in such a way that it is substantially impossible to decrypt the data). Therefore the MD5 hashing algorithm is substantially irreversible.

When the registration form is submitted by the user, the web page 30 applies the MD5 hashing algorithm to the entry corresponding to the MSISDN of the terminal A. The entries (including the MD5 hashed MSISDN—hereafter referred to as MD5[MSISDN]) are then sent in a standard http request from the web page 30 to the servlet interface 201 of the third party communications server 50.

The servlet interface 201 forwards the http request to the database manager 32. The database manager is one of the databases 208 on the server 50. The database manager 32 stores the entries in the secure registration directory 224. In the embodiment, the secure registration directory 224 is one of the databases 208 located on the server 50. The secure registration directory 224 comprises a look-up table of contact information. In the embodiment, the secure registration directory 224 comprises a look up table of instant messaging usernames, against the corresponding MD5[MSISDN] for each registered user (and possibly other information relevant to that user).

Adding Contacts

On mobile terminals, contacts are conventionally stored in a contacts directory 40. The local contacts directory 40 is an application programmed into the mobile terminal A. The contacts directory can be a standard application for storing contact information.

PIM API 41 is a Java interface that interacts with the contacts directory 40 for the client application 52. Normally, the telephone number (MSISDN) of the contact is stored in the contacts directory 40 on the mobile terminal, together with the name of the contact. As discussed above in relation to the prior art, the usernames for instant messaging are not normally stored on the contacts directory of a mobile terminal because these are not widely known. However, if a user A wishes to have the ability to perform instant messaging with a user B, it is necessary for user A to know user B's instant messaging username.

The process for obtaining the instant messaging username of a contact stored on a first user terminal A will now be described with reference to FIG. 5. Using the client application 52 and the PIM API 41, the user of terminal A selects their friend, user B from the local contacts directory 40 of his terminal. The MSISDN of user B is stored in the contacts directory 40.

The client application 52 stores a local cache of each entry in the contacts directory 40, together with (if available) the necessary information for instant messaging—for example the instant messaging username and the presence status of each contact. When the user of terminal A requests the instant messaging username of user B, the client application 52 checks whether the instant messaging username of user B is stored by the client application 52. If the instant messaging user name is stored by the client application 52, then instant messaging can be performed in the known manner for IMS. If it is not, the client application 52 changes the entry corresponding to the presence status of user B as "pending". The client application 52 then prepares to request the instant messaging username of user B from the third party communications server 50.

As explained previously, it is undesirable for the MSISDN of a network's subscribers to be revealed to the third party communications server 50. Therefore the client application 52 applies the MD5 hash algorithm to the MSISDN of the user B. The client application 52 then sends the resulting MD5[MSISDN] via an http request message to the "AddContact" Servlet interface 42 on the third party communications server 50 (message A). The "AddContact" Servlet interface 42 is one of the Servlet interfaces 201 located on the server 50. The "AddContact" servlet interface 42 passes the request to the database manager 32. The database manager 32 searches the secure registration directory 224 for an entry corresponding to the MD5[MSISDN] of user B, i.e it is determined if the MD5[MSISDN] received from the user terminal A matches an MD5[MSISDN] stored in the secure registration directory 224.

Two possible courses of action are subsequently taken, depending upon whether the entry corresponding to the MD5 [MSISDN] is stored in the registration directory 224.

If user B has already registered for the service (for example using the above-described process), then user B's MD5 [MSISDN] is already stored in the registration directory 224. In this case, the database manager 32 passes the contact information of user B, including user B's instant messaging username, to the message manager 202. The message manager 202 sends the contact information of user B (including the username) to the client application 52 in an http response message in a defined XML format (message B). Messages A and B constitute a single http request/response. The client application 52 then prompts the user of terminal A, using the GUI of the terminal A, to confirm whether he would like to add the contact information.

Assuming that the user of terminal A confirms that he would like to add the instant messaging username of user B to his list of contacts, the client application 52 sends a confirmation message to the messaging manager 202 of the server 50. The messaging manager 202 of the server 50 then sends a SIP NOTIFY message to user B to notify user B of user A's "Add Contact" request. (SIP NOTIFY messages are defined in the IMS specifications for functions such as adding contacts to server based address books and notifying users of "Add Contact" requests). User B is then given the option to accept or reject user A's "Add Contact" request, using the GUI of the terminal B. Assuming that user B accepts the request, a SIP NOTIFY acceptance message is sent to the messaging manager 202.

On receipt of the acceptance message, the messaging manager 202 sends a SIP NOTIFY message to the client application 52 of user terminal A to acknowledge user B's acceptance. User B's presence status on the client application 52 of user terminal A is then changed from pending to user B's current status. User B is also added to the communication server address book 309. The communication server address book 309 comprises a list of contacts for each registered user of the service, and is stored on the server 50. The MD5 [MSISDN] of each contact is stored in the communication server address book 309, together with other contact information, for example each contact's presence state and their instant messaging user name. The communication server address book 309, in the embodiment, is an XCAP server which is defined in the IMS specifications for functions such as adding contacts to server based address books.

Instant messaging between user A and user B can then be performed as defined in IMS.

If user B's MD5[MSISDN] is not already stored in the registration directory 224, a different course of action is taken. In this case, the database manager 32 adds the MD5 [MSISDN] of user B to a "pending" table in the secure registration directory 224. The entry in the pending table includes the MD5[MSISDN] of user B, together with the SIP address of user A.

The database manager 32 also indicates to the message manager 202 that a message should be sent to the client application 52, indicating that user B is not found. In response, the message manager 202 sends an http response message to the client application 52 (message C), together with joining information for user B. Messages A and C constitute a single http request/response. The joining information could be for example a URL of an address from where the client application could be downloaded and where user B could register for the service. The client application 52 then prompts the user of terminal A, using the GUI of the terminal A, to confirm whether he would like to invite the user B to join the instant messaging community. If the user confirms that he would like user B to join, the client application 52 sends the joining information to user B in an SMS or WAP push message (which is addressed to user B by the MSISDN of a user B, since this is information contained unencrypted on the local device). The SMS or WAP push message is necessarily sent from user A rather than the server 50 because the MSISDN of user B is not stored on the server 50.

A message confirming user A's invite is then sent to the server 50.

The SMS or WAP push message activates a prompt on user B's terminal, inviting user B to register for the service. The message also contains a link (for example a URL) to a downloadable version of the client application 52.

If user B agrees to register for the service, user B accesses the relevant web page 30, as described with reference to user A. User B is able to specify on the registration form on the web page 30 his device preferences. This allows the client application to be automatically configured to the device preferences of user B. When user B submits the form, the configured client application 52 is then downloaded to user B's terminal.

As described with reference to user A, when user B submits the registration form, user B's MSISDN is MD5 hashed and the entries are sent as an http request message to the "AddContact" servlet 42 on the client servlet interface 201. The "AddContact" servlet 42 passes the request to the database manager 36. The database manager searches for the MD5 [MSISDN] of user B and finds the previously stored entry in the "pending" table in the secure registration directory 224. The messaging manager then adds the MD5[MSISDN] of user B to the secure registration directory, together with the entries submitted in the registration form.

The database manager 32 then passes the contact information of user B, including user B's instant messaging username, to the message manager 202. The message manager 202 sends the contact information of user B to the client application 52 of user A in an http response message. The client application 52 of user A then prompts the user of terminal A, using the GUI of the terminal A, to confirm whether he would like to add the contact information.

Assuming that the user of terminal A confirms that he would like to add the instant messaging username of user B to his list of contacts, the client application 52 of user A sends a confirmation message to the messaging manager 202 of the server 50. The messaging manager 202 of the server 50 then sends a SIP NOTIFY message to user B to notify user B of user A's "Add Contact" request. User B is then given the option to accept or reject user A's "Add Contact" request, using the GUI of the terminal B. Assuming that user B accepts the request, a SIP NOTIFY acceptance message is sent to the messaging manager 202.

On receipt of the acceptance message, the messaging manager 202 sends a SIP NOTIFY message to the client application 52 of user terminal A to acknowledge user B's acceptance. User B's presence status on the client application 52 of user terminal A is then changed from pending to user B's current status. User B is also added to the communication server address book 309 of user A.

Although the first embodiment described above is based around user discovery for an IMS network, it will be clear to those skilled in the art that this same concept can in fact be extended to cover many other user discovery use cases where the MSISDN is the only known unique user identifier but, for security reasons, should not be revealed to a third party who may be managing the service.

One such usage scenario that could also employ this concept is based around service discovery for a social networking website such as Facebook. The normal user identifier used here is the e-mail address but the same concept can be applied to allow subscribers to search for contacts using a hash of the contact's MSISDN. In such applications, subscribers may be reluctant to provide their MSISDN to the website or for publication. However, they may be comfortable allowing the website to use a hashed version of the MSISDN for searching purposes.

Figure 6:
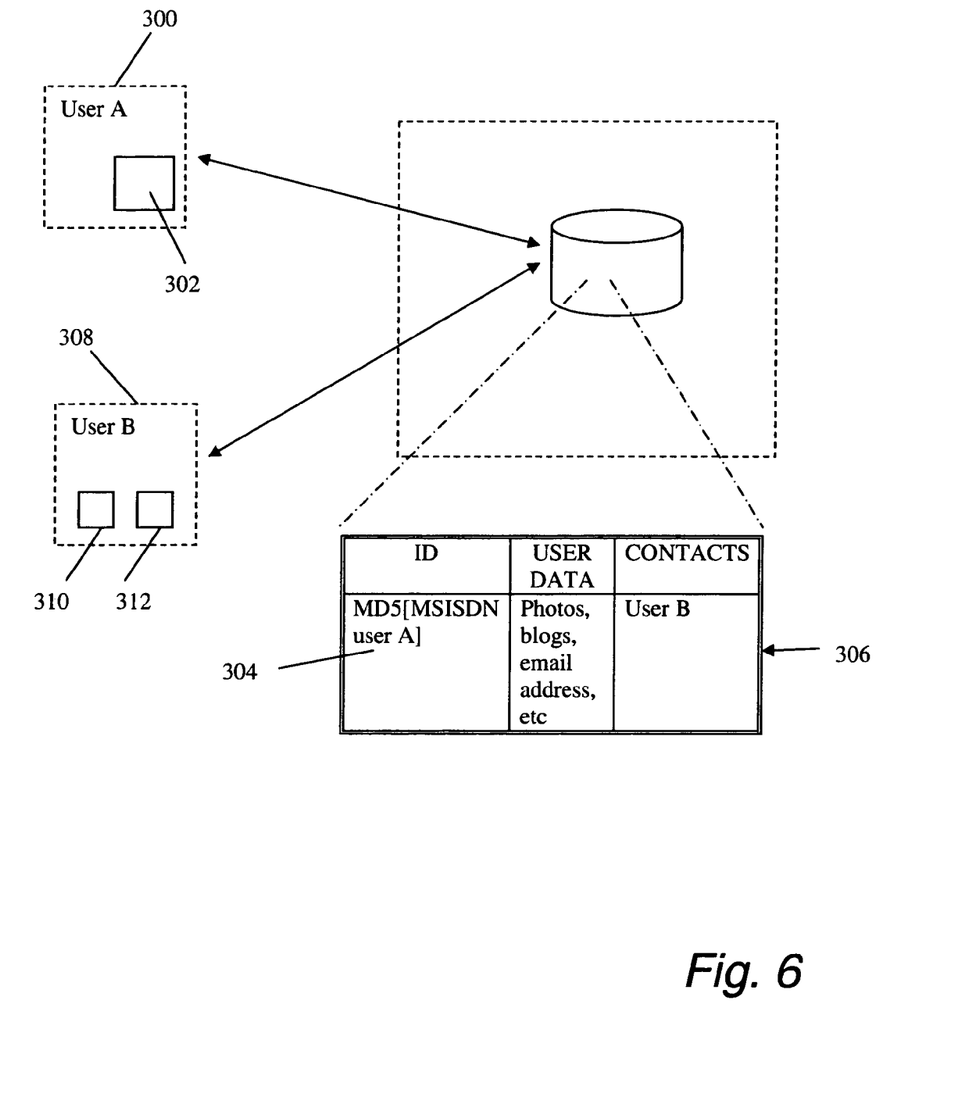
FIG. 6 shows the elements and logical entities of a second embodiment.

In an example of such embodiments, User A 300 registers on the social networking website and includes in the registration an MD5 or equivalent hashed version of their MSISDN. The hashed version could be generated using a Browser Plug-in 302. Most commonly available Internet browsers allow software developers to create plug-ins or extensions in order to extend the functionality provided by that browser. In this scenario, one such plug-in could allow a user to automatically generate an MD5 hash of information entered into a text field so there is no need to rely on this being done by the third party service (which may or may not be trusted).

The MD5 hash 304 of the MSISDN is then stored with the subscriber's profile 306 and is a searchable parameter.

When a User B 308 accesses the social networking website application, for example from its mobile device, it is provided with the opportunity to search for contacts based on MSISDN. If User B 308 is accessing the application directly from its mobile device or from a device having a contacts facility it could simply select the desired contact from its address or phone book 310 in order to provide the MSISDN. Alternatively, it could enter the MSISDN manually.

Many popular social networking websites such as Facebook provide a web-based Application Programming Interface (web API) that allows software developers access to website functionality in their own applications. In this scenario, a software developer could utilise these APIs to develop a J2ME-based mobile application that allowed users to select contacts from their phone book and then add them as friends on the social networking website.

User B 308 selects User A from his phone book 310 as a contact for whom he wishes to search. The J2ME 312 application generates the MD5 hash of User A's MSISDN and then launches the search in the social networking website using the web API. When a match is found, User B is added as a contact for User A.

Embodiments of the invention take advantage of the fact that certain identifiers are unique, for example MSISDN, and, hence, make useful personal identifiers. However, subscribers are often sensitive about providing such identifiers to third parties. By hashing the unique identifier using a one way hashing algorithm (for example MD5), a unique and anonymous identifier is produced. This anonymous identifier can safely be provided to third party applications as part of a subscriber's profile and can be useful as a searchable identifier for the subscriber. Thus, subscribers are able to provide a unique and anonymous identifier based on a sensitive identifier to a third party without providing the sensitive identifier to the third party.

It will be clear to those skilled in the art that any personal identifier, whether unique or not, capable of being encrypted by a one way algorithm may be used in embodiments of the invention to provide a useful searchable parameter on both trusted and untrusted applications. Unique identifiers, for example MSISDN, are particularly useful for creating search terms due to their unique nature.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of making available data to a second user device, which data relates to a first user device identified by a network ID in a telecommunications network, comprising:
  receiving from the first user device, at a non-transitory computer readable data store operated by a third party communication server, a first corresponding value of the first user device derived from the network ID of the first user device, wherein the network ID cannot be derived from the first corresponding value by the third party communication server;
  associating, using at least one processor, said data in the non-transitory computer readable data store with the first corresponding value, wherein the non-transitory computer readable data store does not have access to the network ID; and enabling said data to be retrieved by the second user device, using at least one processor, from the non-transitory computer readable data store, wherein the enabling said data to be retrieved includes:

receiving from the second user device, at the non-transitory computer readable data store, a second corresponding value of the first user device derived from the network ID of the first user device wherein the network ID cannot be derived from the second corresponding value, wherein the third party communication server is separate from a network core of the telecommunications network with which the first user device is subscribed, and retrieving said data associated with the first corresponding value based on a comparison of the first corresponding value and the second corresponding value, wherein said data is retrieved when the second corresponding value is the same as the first corresponding value.

2. The method of claim 1, wherein said network ID is stored by the second user device.

3. The method of claim 1, wherein at least one of the first and the second corresponding values is derived from the network ID by encryption performed using a hashing algorithm.

4. The method of claim 1, wherein the network ID is a personal identifier.

5. The method of claim 1, wherein the network ID is an MSISDN.

6. The method of claim 1, wherein at least one of: the first user device and the second user device comprises a device having a client application installed thereon and wherein the client application provides the non-transitory computer readable data store with one of the first or second corresponding values derived from the network ID.

7. The method of claim 1, wherein the third party communication server is separate from a network core of the telecommunications network with which the second user device is subscribed.

8. The method of claim 1, wherein the deriving at least one of the first and second corresponding value from the network ID is performed by irreversible encryption of said network ID.

9. A system for making available data to a second user device, which data relates to a first user device identified by network ID in a telecommunications network, comprising:

a store, operated by a third party communication server, for:

storing said data, receiving, from the first user device, a first corresponding value of the first use derived from the network ID of the first user device, wherein the network ID cannot be derived from the first corresponding value by the third party communication server, and receiving, from the second user device, a second corresponding value of the first user device derived from the network ID of the first user device, wherein the network ID cannot be derived from the second corresponding value, and wherein the third party communication server is separate from a network core of the telecommunications network with which the first user device is subscribed, wherein the store does not have access to the network ID and is operated by a third party communication server;

an associating device for associating said data in the store with the first corresponding value; and a retrieving device for enabling said data to be retrieved by the second user device from the store by comparing the received first corresponding value and second corresponding value, wherein said data is retrieved when the second corresponding value is the same as the first corresponding value.

10. The system of claim 9, wherein said network ID is stored by the second user device.

11. The system of claim 9, wherein at least one of the first and the second corresponding values is derived from the network ID by encryption performed using a hashing algorithm.

12. The system of claim 9, wherein the network ID is a personal identifier.

13. The system of claim 9, wherein the core network ID is an MSISDN.

14. The system of claim 9, wherein at least one of: the first user device and the second user device comprises a device having a client application installed thereon, and wherein the client application provides the store with one of the first and second corresponding values derived from the network ID.

15. The system of claim 9, wherein the third party communication server is separate from a network core of the telecommunications network with which the second user device is subscribed.

16. The system of claim 9, wherein the deriving at least one of the first and second corresponding value from the network ID is performed by irreversible encryption of said network ID.

* * * * *